United States Patent [19]
Kuramoto et al.

[11] 3,712,193
[45] Jan. 23, 1973

[54] SHUTTER SPEED INDICATING DEVICE FOR ELECTRICALLY CONTROLLED SHUTTER MECHANISMS

[75] Inventors: Yoshio Kuramoto, Sakai; Hiroshi Ueda, Nara, both of Japan

[73] Assignee: Minolta Camera Kabushiki Kaisha Osaka-shi, Osaka-fu, Japan

[22] Filed: Oct. 30, 1970

[21] Appl. No.: 85,545

[30] Foreign Application Priority Data

Oct. 31, 1969  Japan ................................44/104002

[52] U.S. Cl. .......................95/10 C, 95/42, 95/53 R
[51] Int. Cl. ...........................G01j 1/42, G03b 17/20
[58] Field of Search ....................95/10 C, 42, 53 R

[56] References Cited

UNITED STATES PATENTS

| | | | |
|---|---|---|---|
| 3,485,154 | 12/1969 | Takeo Yamada | 95/10 C |
| 3,485,153 | 12/1969 | Shigeo Ono et al. | 95/10 |
| 3,303,766 | 2/1967 | Toru Karikawa et al. | 95/10 C |
| 3,261,273 | 7/1966 | Broschke | 95/10 C |

FOREIGN PATENTS OR APPLICATIONS 1,220,249  6/1966  Germany ...........................95/10 C Primary Examiner—Joseph F. Peters, Jr.
Attorney—Watson, Cole, Grindle & Watson

[57] ABSTRACT

A shutter speed indication device comprises a following pointer coaxially rotated with the meter pointer and interlocking with a shutter speed setting dial for setting manual and automatic exposure time control to indicate the limit of the exposure time within which camera movement will not affect the taking of a photograph.

4 Claims, 4 Drawing Figures

A SHUTTER SPEED INDICATING DEVICE FOR ELECTRICALLY CONTROLLED SHUTTER MECHANISMS

BACKGROUND OF THE INVENTION

The present invention relates to shutter speed indication devices for electrically controlled shutter mechanisms, capable of change-over between automatic exposure control and manual exposure time setting, and more particularly relates to a shutter speed indication device having a meter pointer and a following pointer displayed in the view finder. In the manual exposure setting the following pointer interlocks with the shutter speed set up dial so as to follow the meter pointer. When the shutter control is changed over automatically to electric control in accordance with the brightness of an object, the diaphragm setting, and the film sensitivity, the following pointer indicates the exposure time limit that will ensure a photograph unaffected by undesirable movement of a hand-held camera.

An electric operated shutter mechanism has the advantages of being able to control the proper exposure for photographic conditions which vary over a wide range, such as film sensitivity, diaphragm setting, and object brightness, and to change-over to automatic exposure control from manual exposure control by connecting the photoconductive element and disconnecting the set resistance in the electric delay circuit. However, in automatic exposure control photography the automatically controlled exposure time determined by the photographic conditions may often exceed the longest exposure time (for example, one thirtieth second) within which camera movement will not affect the photograph, and in that case the blurred photograph could have been prevented if the camera operator had been aware of that condition beforehand.

In known camera shutter control mechanisms, when the automatically controlled exposure time exceeds a certain limit a shutter release lock is effected, however, in such a device, if a flash device is not provided there is no opportunity to take a photograph.

OBJECTS OF THE INVENTION

An object of the present invention is to provide a shutter speed indication device for an electrically controlled shutter mechanism, which removes the drawbacks mentioned above by providing an indication to the camera operator exposure times exceeding a certain exposure time limit before the shutter mechanism is operated.

Another object of the present invention is to provide a shutter speed indication device for an electrically controlled shutter mechanism, for indicating a limit to the exposure time within which camera movements will not affect the photograph in an automatic electrical shutter exposure control mode time in accordance with the photographic conditions when the electric shutter sets up the manual exposure.

A further object of the present invention is to provide a shutter speed indication device which cooperates with the pointer of a light meter and a shutter speed setting dial to aid in selecting the proper resistance for the exposure delay circuit or in selecting the proper diaphragm setting with manual exposure time control operation of the camera.

Further objects and other advantages of the present invention will be apparent from the following description of an embodiment in accordance with the present invention taken in conjunction with the accompanying Figures.

SUMMARY OF THE INVENTION

According to the present invention, a following pointer is coaxially rotated with a light meter pointer and the rotation thereof is controlled in accordance with the rotation of a shutter speed setting dial for both automatic and manual exposure time control. In the manual exposure control mode of operation alignment of the following pointer with the light meter pointer, which is also adjusted in accordance with the film sensitivity and the diaphragm setting, enables the proper resistance to be selected for the proper exposure time in the shutter control delay circuit, or, alternatively, the exposure time can be selected by proper rotation of the shutter speed setting dial and the diaphragm aperture selected so that the following pointer and the light meter pointer are in alignment.

DETAILED DESCRIPTION

Figure 1:
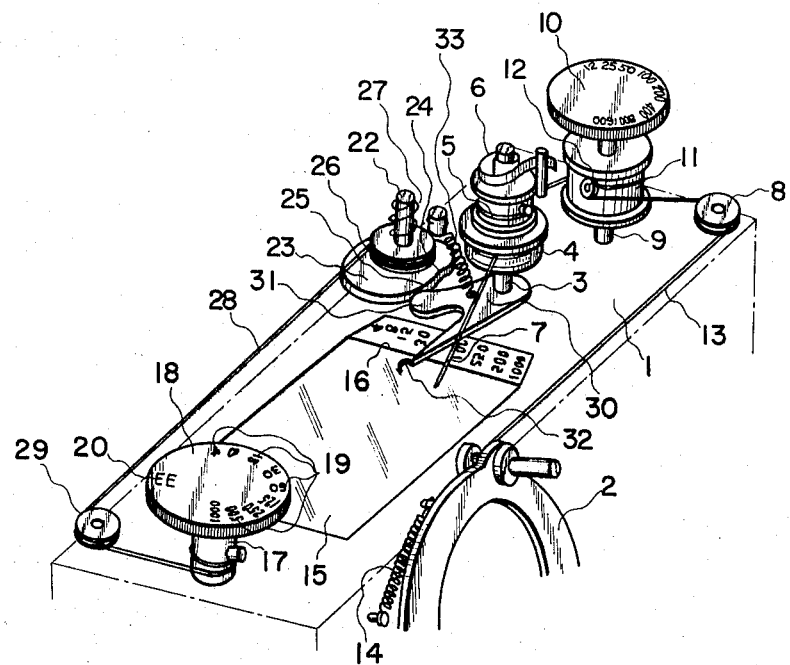
FIG. 1 is a perspective view of the essential portion of the structure of an embodiment in accordance with the present invention.

In FIG. 1, on camera body 1 there is mounted on the front thereof diaphragm coupling ring 2 which is coupled to a lens barrel diaphragm ring (not shown) to transmit the displacement angle of the diaphragm ring when the lens barrel is fixed to the camera body 1. Meter rotary shaft 3 is rotatably mounted to camera body 1 and ammeter 4 is fixed to rotary shaft 3. Pointer 7 of ammeter 4 rotates about the axial center of meter rotary shaft 3. Pulley 5 is also mounted to meter rotary shaft 3.

Shaft 9 is also rotatably mounted to camera body 1 and film sensitivity change-over dial 10 and pulley 11, having floating pulley 12, are mounted thereon. Pulley 8 is also rotatably mounted to camera body 1.

One end of wire 13 is fastened to diaphragm coupling ring 2, and wire 13 engages floating pulley 12 through pulley 8 and is connected to pulley 5. Wire 13 is tensioned by spring 14 connected to diaphragm coupling ring 2 and spring 6 mounted to meter rotary shaft 3 to provide a winding tendency thereto, and diaphragm coupling ring 2 is given a counter-clockwise turning tendency by spring 14.

Control cam 23 and pulley 26 are fixed to control shaft 22 rotatably mounted on camera body 1. Indication member 30 is mounted rotatably on meter rotary shaft 3 and is provided with two arms, one of which comprises following pointer 32 and the other of which forms control arm 31. Control arm 31 has a clockwise turning tendency from spring 33 so as to be always in contact with the cam face of control cam 23. Control cam 23 is formed with constant-ratio descending slope cam face 25 and ascending slope cam face 24. Following pointer 32 and pointer 7 of ammeter 4 have their tips respectively facing shutter speed indication plate 16 formed on one side of view finder focal plate 15.

Figure 4:
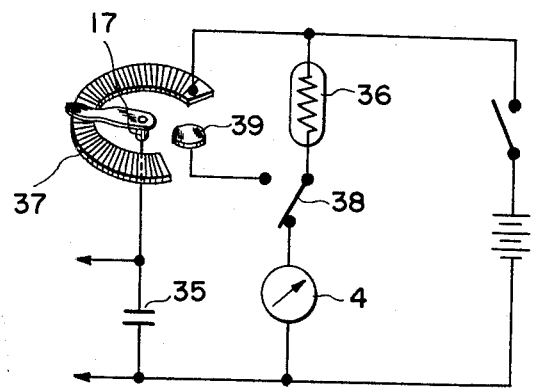
FIG. 4 is a diagram of the pertinent electric shutter control circuitry operated in conjunction with the embodiment shown in FIG. 1.

Shutter speed setting shaft 17 is connected rotatably to camera body 1 on the opposite side thereof as rotary shafts 3 and 22 and has setting shutter speed dial 18 mounted thereto. Automatic exposure control scale 20 EE and manual exposure setting scale 19 are located on the top surface of shutter speed setting dial 18. and The turning of shutter speed setting dial 18 so as to align either of scales 20, 19 with mark 21 provided on top face 34 of the camera outer housing in FIG. 2, connects capacitor 35 in the electric delay circuit shown in FIG. 4 to photoconductive element 36 or variable resistance 37 respectively for automatic or manual exposure time control. Photoconductive element 36 is ordinarily connected to ammeter 4 through change-over switch 38 and operates ammeter pointer 7 for both manual exposure and automatic exposure control, and is connected to automatic exposure control terminal 39 of shutter speed setting dial by a mechanism interlocking with the shutter release and change-over switch 38.

Wire 28 is connected to shutter speed setting shaft 17 and engages pulley 26, fixed to control shaft 22, through pulley 29 rotatably mounted onto the top face of camera body 1, and wound around control shaft 22 and kept in tension by spring 27 which provides a clockwise turning tendency to control shaft 22. When one of the exposure time scales of manual exposure time setting scale 19 is aligned with mark 21, arm 31 is rotated by means of its engagement with constant-ratio descending slope cam face 25 of control cam 23 and thereby following pointer 32 indicates the exposure time on shutter speed indication plate 16. Whereas, upon turning shutter speed set up dial 18 so as to align automatic exposure set up scale 20 with mark 21, control cam 23 rotates control arm 31 by means of its ascending slope cam face 24 and thereby following pointer 32 indicates on shutter speed indication plate 16 the longest exposure time, for example one-thirtieth second, as that limit within which a photograph may be taken without adverse affects caused by movement of the camera.

Therefore, in accordance with the embodiment as described above manual exposure time control is carried out by first adjusting film sensitivity dial 10 to the film sensitivity and meter shaft 3, ammeter 4 and pointer 7 turn respectively via wire 13. Also, wire 13 is moved in accordance with the diaphragm setting set by diaphragm coupling ring 2 to turn meter shaft 3, ammeter 4 and pointer 7, and thus meter pointer 7 indicates the proper exposure time on shutter speed indication plate 16 through the electric current running through photoconductive element 38 corresponding to the brightness of an object.

Figure 2:
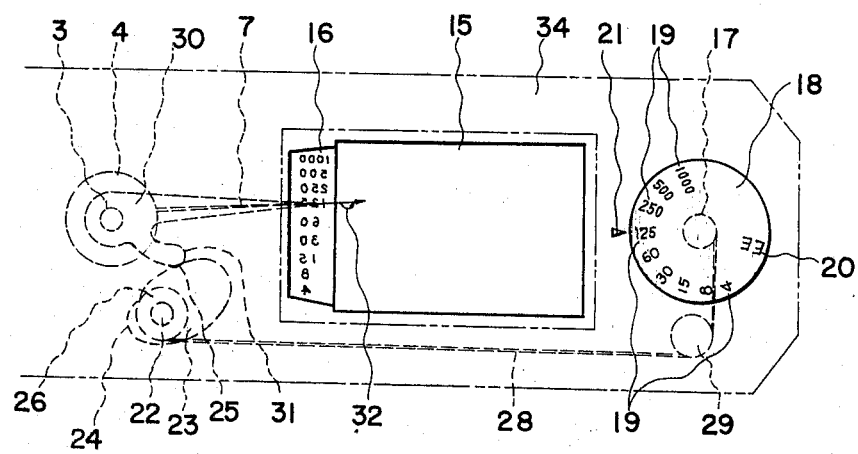
FIG. 2 is a top view of the essential portion of the embodiment shown in FIG. 1 for manual exposure time control.

Then, shutter speed setting dial 18 is rotated until following pointer 30 is aligned with meter pointer 7, via the cooperation between constant-ratio descending slope cam face 25 of control cam 23 and control arm 31, so that the exposure scale setting aligned with mark 21 on the shutter speed setting dial coincides with the exposure time indicated by both pointers 7, 32 on shutter speed indication plate 16 as indicated in FIG. 2. Thereby the resistance value of resistance 37 connected in series to capacitor 35 in the electric delay circuit is established to provide the proper exposure time in accordance with the known relationship:

$$T_v = S_v + B_v - A_v$$

Wherein $T_v$ is the shutter speed, $S_v$ is the film sensitivity, $B_v$ the brightness of an object, and $A_v$ the diaphragm value setting.

Conversely, upon aligning the exposure time desired on shutter speed set up dial 18 with mark 21 and turning diaphragm coupling ring 2 so that meter pointer 7 corresponds to following pointer 32 on shutter speed indication plate 16, the diaphragm setting corresponding to the shutter speed can be obtained as well by the same relationship, namely, $$A_v = S_v + V_v + T_v$$

Figure 3:
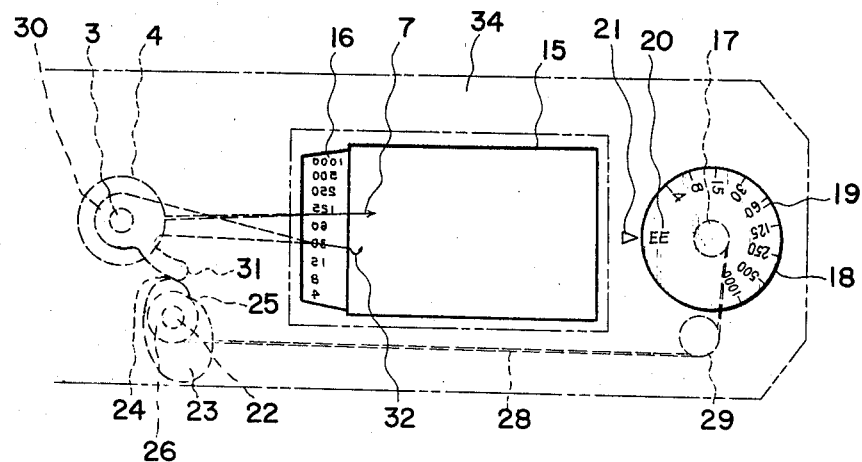
FIG. 3 is a top view of the structure shown in FIG. 2 for automatic exposure time control.

For automatic exposure control, after the film sensitivity and the diaphragm setting are set up respectively, upon aligning the EE scale for indicating automatic exposure control on shutter speed set up dial 18 with mark 21, the rotation of shaft 17 thereof connects photoconductive element 36 in series with capacitor 35 in the delay circuit in the electric shutter control circuit. Simultaneously therewith, as shown in FIG. 3, control arm 31 is restrained by the fixed position on ascending slope cam face 24 of control cam 23, and following pointer 32 indicates, for example one-thirtieth second, as the longest exposure time within which camera movement will not affect the photograph on shutter speed indication plate 16. Thereby, before photographing there is an indication when meter pointer 7 is on the longer time exposure side than following pointer 32 it is necessary to either change the diaphragm setting or to put the camera on a pedestal.

We claim:
1. Shutter control apparatus for a photographic camera comprising:
a shutter speed setting member movable both to an automatic exposure position and to a number of manual shutter speed positions;
a film speed setting member;
a coupling member movable in accordance with the diaphragm aperture setting;
a photoresponsive element receptive to scene light;
a first indicating means responsive to said photoresponsive element for indicating shutter speed settings;
first means for adjusting the position of said first indicating means as a function of the respective settings of said film speed setting member and said coupling member;
a second indicating means for indicating shutter speed in accordance with the position of said shutter speed setting member; and
second means for adjusting said second indicating means to indicate the lowest shutter speed setting that will provide a non-blurred photograph with said shutter speed setting member in said automatic exposure position and for adjusting said second indicating means to indicate identical shutter speed settings as said first indicating means with said shutter speed setting member in said number of manual shutter speed positions.

2. Shutter control apparatus for a photographic camera as set forth in claim 1, wherein said first indicating means is an ammeter rotatably mounted to the camera body and having a light pointer, said ammeter is rotated in accordance with the respective settings of said film speed setting member and said coupling member;

said second indicating means is a second pointer mounted to the camera body coaxially with said light pointer and rotatable independently therewith; and said second means for adjusting is a cam having first and second cam surfaces and connected to be movable with movement of said shutter speed setting member whereby said first cam surface and said second cam surface engage with said second indicating means with said shutter speed setting member in said automatic exposure position and said number of manual shutter speed positions, respectively.

3. Shutter control apparatus as in claim 2 wherein said film speed setting member is rotatably mounted to the camera body; and said first adjusting means includes a first pulley mounted to said film speed setting member, a second pulley mounted to said film speed setting member and independently movable therewith, a third pulley coaxially mounted to the camera body with said light meter and rotatable therewith, and a first wire connecting said coupling member, and said first, second and third pulleys; and said second means for adjusting includes a fourth pulley coaxially mounted with said cam and rotatable therewith and a second wire connecting said shutter speed dial member and said fourth pulley.

4. Shutter control apparatus as in claim 3 further comprising: a voltage source, an integrating capacitor, a two-position switch connecting said photosensitive element and said ammeter in one position, a variable resistance and switch member having a contact rotatable with said shutter speed setting dial, said contact connecting said variable resistance to said capacitor with said speed shutter setting member in said number of manual shutter speed positions and connecting said photoresponsive element to said capacitor with said shutter speed setting member in said automatic exposure position and said two-position switch in the other position; and said two-position switch is moved to said other position with operation of a member initiating shutter release.

* * * * *